United States Patent
Pauchet et al.

(10) Patent No.: US 9,188,247 B2
(45) Date of Patent: Nov. 17, 2015

(54) CABLE SECURING DEVICE

(71) Applicant: AIRBUS OPERATIONS SAS, Toulouse (FR)

(72) Inventors: Stephane Pauchet, Guerande (FR); Julien Tonnellier, La Baule-Escoublac (FR); Patrick Mongiorgi, Saint Nazaire (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 13/920,215

(22) Filed: Jun. 18, 2013

(65) Prior Publication Data
US 2014/0027584 A1   Jan. 30, 2014

Related U.S. Application Data

(63) Continuation of application No. 13/249,461, filed on Sep. 30, 2011, now abandoned.

(30) Foreign Application Priority Data

Sep. 30, 2010   (FR) ..................................... 10 57893

(51) Int. Cl.
*F16L 3/12* (2006.01)
*F16L 3/123* (2006.01)
*H02G 3/32* (2006.01)

(52) U.S. Cl.
CPC . *F16L 3/123* (2013.01); *H02G 3/32* (2013.01)

(58) Field of Classification Search
CPC .................................. F16L 3/123; H02G 3/32
USPC .............. 248/65, 70, 71, 73, 74.1, 74.2, 74.3, 248/74.4, 74.5; 24/16 R, 442, 306
See application file for complete search history.

(56) References Cited

U.S. PATENT DOCUMENTS

| | | | | |
|---|---|---|---|---|
| 2,373,833 | A | * | 4/1945 | Johnson ........................ 248/74.3 |
| 2,601,736 | A | * | 7/1952 | Fisher .......................... 43/43.11 |
| 2,884,214 | A | * | 4/1959 | Wrobel ......................... 248/74.3 |
| 3,050,578 | A | * | 8/1962 | Huebner ..................... 174/40 CC |
| 3,099,054 | A | * | 7/1963 | Spiro ........................... 24/16 PB |
| 3,162,413 | A | * | 12/1964 | Hexdall .......................... 248/71 |
| 3,169,004 | A | * | 2/1965 | Rapata ............................ 248/71 |
| 3,403,429 | A | * | 10/1968 | Smith ............................. 24/306 |
| 3,835,505 | A | * | 9/1974 | Shewbridge ................... 24/16 R |
| 4,049,357 | A | * | 9/1977 | Hamisch, Jr. ................. 403/209 |
| 4,153,228 | A | * | 5/1979 | Delserro et al. ............. 248/74.3 |
| 4,202,139 | A | * | 5/1980 | Hong et al. .................... 451/524 |
| 4,274,612 | A | * | 6/1981 | Massey ........................ 248/74.3 |
| 4,407,472 | A | * | 10/1983 | Beck ............................... 248/89 |
| 4,514,882 | A | * | 5/1985 | Lavielle ...................... 24/16 PB |

(Continued)

*Primary Examiner* — Jonathan Liu
*Assistant Examiner* — Chiedu Chibogu
(74) *Attorney, Agent, or Firm* — Airbus Operations SAS

(57) ABSTRACT

The subject of the invention is a cable securing device comprising a base, a housing having an interior and an exterior surface and two spaced-apart edges allowing a plurality of cables to be inserted into the said housing, and a tongue connecting the two edges so as to hold the cables in the housing. The said tongue is connected removably at one end, known as the free end, to the first edge. The tongue comprises at least one orifice capable of engaging with a pin provided on the exterior surface of the housing. The interior surface of the tongue comprises a touch-and-close structure capable of engaging with a touch-and-close structure provided on the exterior surface of the housing.

11 Claims, 2 Drawing Sheets

(56) References Cited

U.S. PATENT DOCUMENTS

| | | | |
|---|---|---|---|
| 4,706,914 A * | 11/1987 | Ground | 248/74.3 |
| 4,712,313 A * | 12/1987 | Gettleman | 34/97 |
| 4,854,015 A * | 8/1989 | Shaull | 24/16 R |
| 5,031,282 A * | 7/1991 | Denaro | 24/16 R |
| 5,048,160 A * | 9/1991 | Goodrich et al. | 24/306 |
| 5,142,743 A * | 9/1992 | Hahn | 24/16 R |
| 5,638,581 A * | 6/1997 | Burke | 24/30.5 R |
| 6,298,524 B1 * | 10/2001 | Officer | 24/306 |
| 6,430,786 B1 * | 8/2002 | Ikeda et al. | 24/444 |
| 6,499,199 B2 * | 12/2002 | Frazier | 24/306 |
| 6,782,654 B1 * | 8/2004 | Borchardt | 43/54.1 |
| 6,837,237 B2 * | 1/2005 | Kirn | 128/200.24 |
| 6,851,161 B2 * | 2/2005 | Kingsford et al. | 24/306 |
| D521,366 S * | 5/2006 | Polak et al. | D8/383 |
| 7,331,549 B2 * | 2/2008 | Wirth et al. | 248/65 |
| D580,748 S * | 11/2008 | Polak et al. | D8/394 |
| 7,544,404 B2 * | 6/2009 | McMahon | 428/34.9 |
| 7,854,042 B2 * | 12/2010 | Richardson | 24/17 A |
| 8,505,858 B2 * | 8/2013 | Hansen | 248/74.3 |
| 8,678,332 B2 * | 3/2014 | Benthien et al. | 248/205.3 |
| 8,726,468 B2 * | 5/2014 | Dyer | 24/16 PB |
| 8,844,881 B2 * | 9/2014 | West et al. | 248/74.1 |
| 2002/0082619 A1 * | 6/2002 | Cabak et al. | 606/151 |
| 2005/0091822 A1 * | 5/2005 | Powers et al. | 29/432 |
| 2006/0032032 A1 * | 2/2006 | Cheng | 24/306 |
| 2008/0209861 A1 * | 9/2008 | McMahon | 53/442 |
| 2009/0283649 A1 * | 11/2009 | Wood et al. | 248/205.3 |
| 2013/0015301 A1 * | 1/2013 | Zvak | 248/74.1 |
| 2013/0020123 A1 * | 1/2013 | Ruth | 174/480 |

* cited by examiner

CABLE SECURING DEVICE

RELATED APPLICATIONS

The present application is a continuation of U.S. patent application Ser. No. 13/249,461, filed Sep. 30, 2011 and is based on, and claims priority from France Application Number 1057893, filed Sep. 30, 2010, the disclosure of which is hereby incorporated by reference herein in its entirety.

The present invention relates to a cable securing device.

In the field of aeronautical engineering, a device like the one described in FIG. 1 for securing cables to a support is known.

This device comprises a base 10 with a first part 12 pressed firmly against a support 14 using connecting means 16 and a second part 18 in the shape of a C with an opening 20 to allow cables 22 to be inserted. The ends of the branches of the C comprise tabs 24 extending in an approximately radial direction and each having a slotted orifice 26.

First of all, the cables can be prepositioned by inserting them into the C shape. Advantageously, the interior wall of the C-shape has an elastomer coating 28 to protect the cables.

When the wiring is finished, the cables are held in the C-shape by a cable fastener 30 which passes through the two slots 26 and aims to bring the two tabs 24 closer together in order to clamp the cables 22.

To do this, the branches of the C are produced in such a way that they can deform elastically by selecting a suitable material and/or cross section. In addition, the elastomeric covering may contribute towards obtaining this elastic effect.

In a known way, a cable fastener 30, also known as a "tie-wrap", firstly comprises a longilinear flat body with a plurality of notches perpendicular to its length on at least one face and, secondly, comprises a head connected to a first end and having a slotted orifice with a lug capable of engaging in one of the notches of the body so as to immobilize the body relative to the head.

To join the tabs 24 together the second end of the cable fastener has to be fed through the slots 26 in the tabs and through the slot in its head and this second end then has to be pulled.

One first disadvantage is that this type of securing device comprises a use-once part which means that the cable fasteners have to be cut and replaced if one or more cables is to be added, removed or changed.

A first objective of the invention is to provide a reusable and strong securing device.

To this end, the invention proposes a cable securing device comprising a base, a housing having an interior and an exterior surface and two spaced-apart edges allowing a plurality of cables to be inserted into the said housing, a central axis of the said cables defining a longitudinal direction, and a tongue connecting the two edges so as to hold the cables in the housing, the said tongue being connected removably at one end, known as the free end, to the first edge, characterized in that the tongue comprises at least one orifice capable of engaging with a pin provided on the exterior surface of the housing, and in that the interior surface of the tongue comprises a touch-and-close structure capable of engaging with a touch-and-close structure provided on the exterior surface of the housing.

The combination of connecting means of the touch-and-close type and of the pin/orifice type means that a strong removable connection can be achieved.

For preference, the housing comprises two pins positioned in a longitudinal direction and in that the tongue comprises at least two orifices, one for each pin, which are provided on the tongue in order to improve strength.

Another object of the invention is to propose a cable securing device that is easy to use. To this end, the tongue is connected, at the opposite end to the free end, permanently to the second edge of the housing. Further features and advantages will become apparent from the description of the invention which follows, which description is given purely by way of example with reference to the attached drawings in which.

Figure 1:
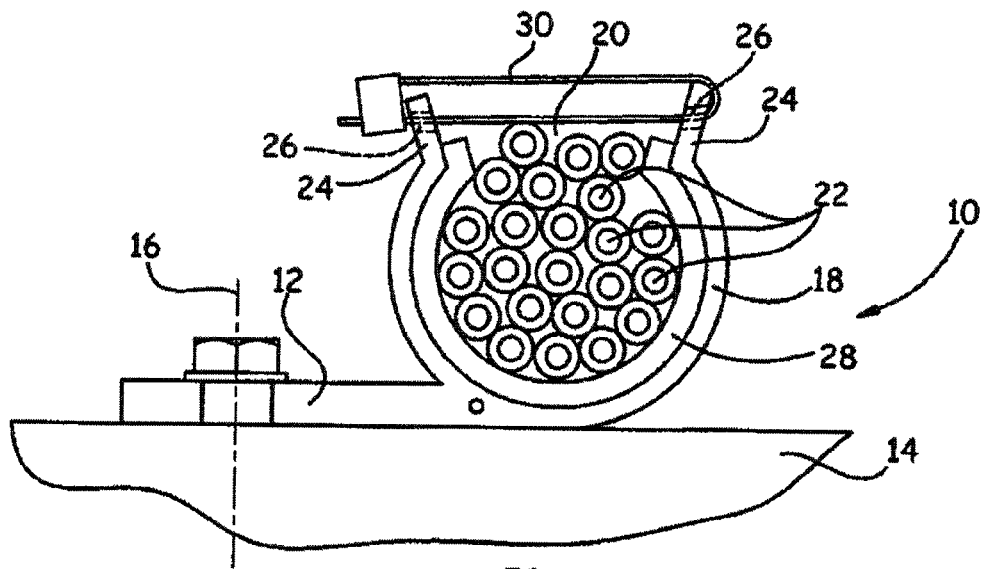
FIG. 1 is a side view of a cable securing device according to the prior art.

According to one embodiment, a cable securing device comprises a base 32 with a first part 34 that can be pressed firmly against a support 36 using connecting means 38 and a second part defining a housing 40 in which the cables 42 can be positioned.

For the remainder of the description, a longitudinal direction means the direction of the cables.

A transverse plane means a plane perpendicular to the longitudinal direction.

Finally, a transverse direction means a direction perpendicular to the longitudinal direction and parallel to the support.

The first part 34 has shapes suited to the support 36. In the case of a support that offers a substantially flat bearing surface, the first part 34 is in the form of a plate, for example a rectangular plate with rounded corners, with an underside surface resting against the substantially flat support 36.

However, other shapes of the first part 34 are conceivable.

The first part 34 comprises at least one orifice 44 allowing the passage of the connecting means 38.

Figure 2:
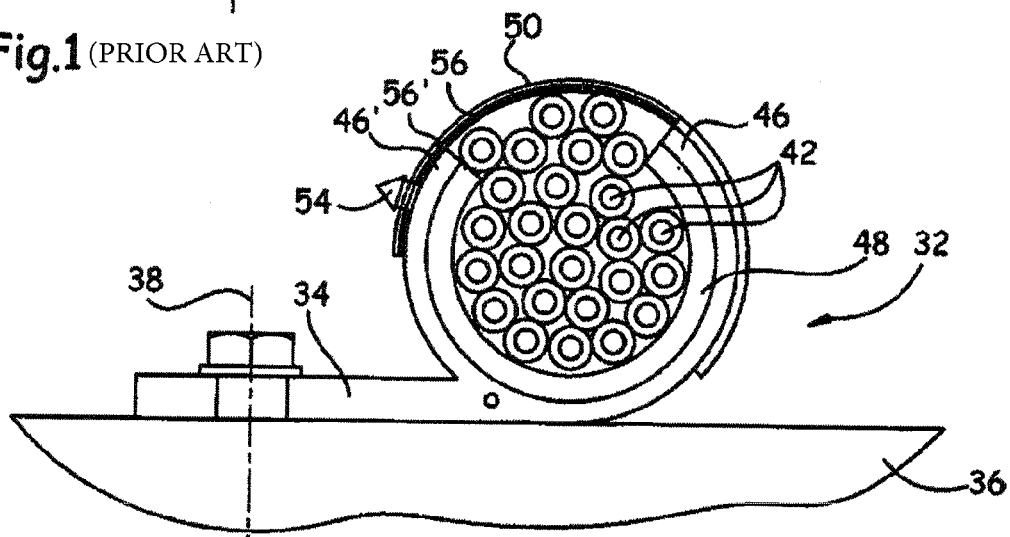
FIG. 2 is a side view of a cable securing device according to the invention.
Figure 3:
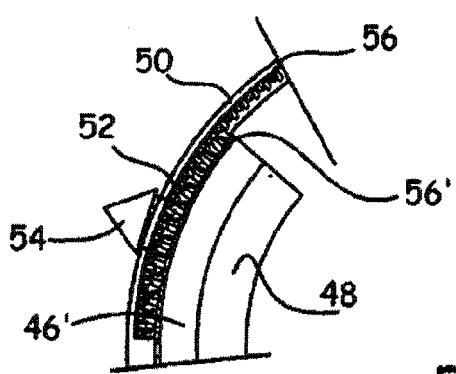
FIG. 3 is a cross section illustrating in detail the removable connection of the securing device of the invention.
Figure 4:
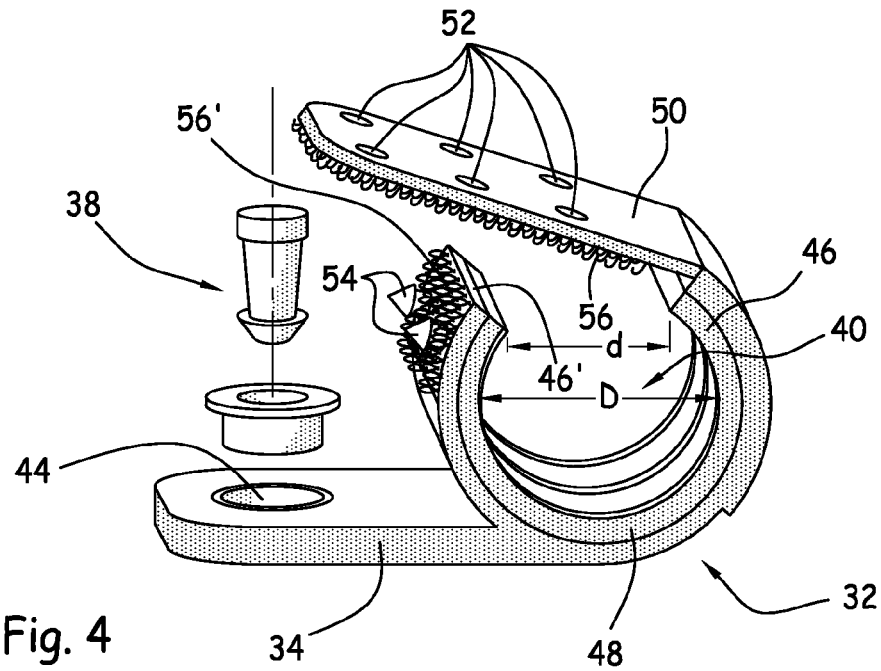
FIG. 4 is a view in perspective from a first direction of a cable securing device.
Figure 5:
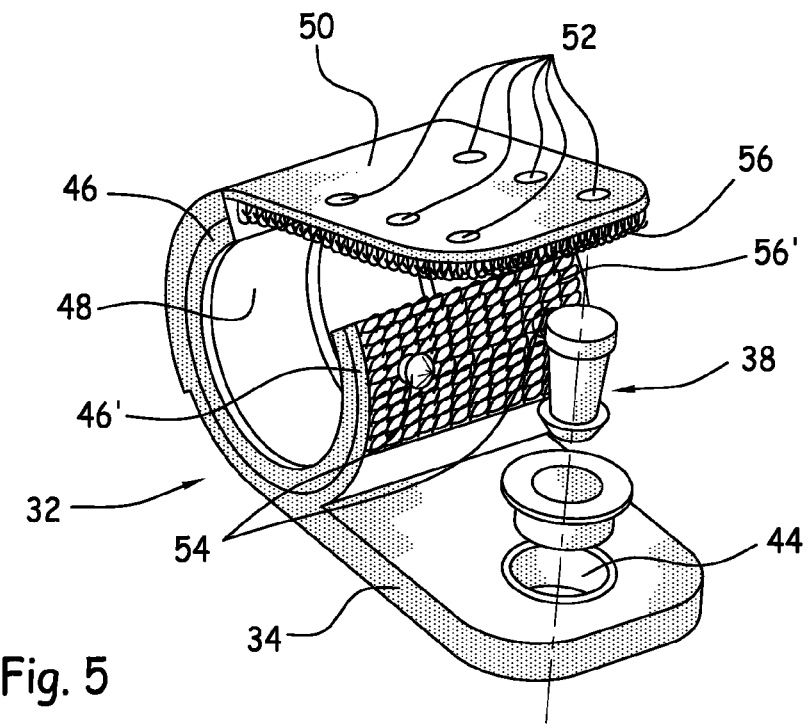
FIG. 5 is a view in perspective from a different direction of a cable securing device.

The connecting means 38 may be in the form of a screw, of bolts (visible in FIG. 2), of rivets or of dowels (visible in FIGS. 4 and 5).

However, the invention is not restricted to these connecting means and likewise covers solutions involving bonding, welding or some other technique.

The second part defines a housing 40 and is in the form of a conduit directed in the longitudinal direction, with a slot that is wide enough to allow the cables to be inserted into the conduit, the said slot or opening being delimited by edges 46, 46', which are preferably parallel to one another and directed in the longitudinal direction.

Depending on circumstance, the width of the slot may vary and the conduit may extend over a greater or smaller sector.

According to one embodiment, the conduit is connected to the first part 34 in such a way as to create two branches extending from the first part 34, the ends of the branches constituting the edges 46, 46'.

Advantageously, the spacing between the branches narrows at the edges 46, 46', so as to retain the cables 42.

According to the embodiment illustrated in FIGS. 2 to 5, the housing 40 is C-shaped.

For preference, the branches have cross sections (in transverse planes) that are substantially constant.

The split conduit housing 40 has a width (in the longitudinal direction) of the order of 0.5 cm to 5 cm in order to provide satisfactory guidance for the cables 42.

According to a preferred embodiment, the first part 34 and the housing 40 are made as a single piece by being moulded in plastic.

The thickness and/or the material of the split conduit are suitable for it being able to deform slightly in an elastic manner so as to increase the cross section for the passage of the cables and thus adapt to suit a range of diameters of cable wiring harness 42.

For preference, the interior face of the split conduit facing towards the cables has a coating 48 aimed at protecting the cables. By way of example, this coating 48 is made of elastomer.

According to the invention, in order to hold the cables in position, the device comprises a tongue 50 permanently connected to one of the edges 46 of the conduit and removably connected to the other edge 46' of the conduit.

This tongue 50 is flexible enough that it can initially uncover the space between the edges 46, 46' to allow the cables to be inserted and can then connect the edges 46, 46'. As shown in FIG. 4, it is noted that the distance "d" between the edges 46 and 46' is smaller than the diameter "D" of the housing 40.

This tongue 50 preferably has a width substantially identical to that of the split conduit.

In a first alternative form, the tongue 50 is separate from the split conduit. In such a case, one of the ends of the tongue 50 is secured by any suitable permanent means to one of the edges 46 of the conduit, for example by bonding.

According to another alternative, the tongue 50 is made as a single piece with the split conduit. In such a case, the tongue 50 has a thickness appreciably smaller than that of the split conduit in order to give it its flexibility.

In order to obtain a removable connection, the free end of the tongue 50 comprises at least one orifice 52 capable of engaging with a pin 54 provided on the exterior surface of the conduit near the edge 46', the surface of the said free end of the tongue that faces towards the split conduit comprising a touch-and-close structure 56 capable of engaging with a touch-and-close structure 56' provided on the exterior surface of the conduit near the edge 46'.

This configuration makes it possible to obtain a securing device that is strong and reusable.

For preference, the exterior surface of the conduit comprises two pins 54 positioned in a longitudinal direction. To complement these, the tongue 50 comprises at least two orifices 52, one for each pin.

This configuration makes it possible to prevent the tongue 50 from pivoting with respect to the edge 46', thus improving the pull-out strength of the removable connection between the tongue 50 and the edge 46'.

Advantageously, the tongue 50 comprises at least one series of orifices 52, one series for each pin 54, the orifices of one and the same series being positioned in a transverse plane and preferably uniformly spaced.

This configuration allows the securing device to be adapted to suit various diameters of cable wiring harness 42.

According to one embodiment, the touch-and-close structures 56 and 56' are touch-and-close structures of the "velcro®" type, the touch-and-close structure 56 comprising loops and the touch-and-close structure 56' comprising hooks.

To provide a better strength, the touch-and-close structure 56' is positioned around each pin 54 while the touch-and-close structure 56 is positioned around each orifice 52.

According to one preferred embodiment, the touch-and-close structure 56 is a strip with loops that is independent of the tongue 50 and secured to the interior surface of the tongue for example by bonding. In parallel, the touch-and-close structure 56° may be incorporated into the branch 46', the hooks of the said structure 56' being produced at the time of moulding of the base.

The invention claimed is:

1. A cable securing device, comprising:
   a base,
   a first part and a second part extending from the base and forming a housing having an interior surface, an exterior surface, and a diameter, wherein an elastomer coating is disposed on said interior surface of said housing, said first part having a first peripheral edge and said second part having a second peripheral edge bounding an opening therebetween and for allowing a plurality of cables to be inserted through said opening into the said housing, wherein the distance between said first peripheral edge and said second peripheral edge is smaller than the diameter of said housing, and wherein said elastomer coating extends from said first peripheral edge to said second peripheral edge,
   a tongue connecting said first peripheral edge and said second peripheral edge together so as to hold in use the cables in the housing, said tongue having an interior surface and being connected removably at one end to the first peripheral edge, wherein the tongue comprises at least one orifice capable of engaging with a pin provided on an exterior surface of the first part, and wherein the interior surface of the tongue comprises a touch-and-close structure configured to engage with a touch-and-close structure provided on the exterior surface of the first part, the pin is surrounded by the touch-and-close structure on the exterior surface of the first part, and the at least one orifice is surrounded by the touch-and-close structure of the tongue.

2. The cable securing device according to claim 1, characterized in that the exterior surface of the first part comprises two pins, and in that the tongue comprises at least two orifices, one for each pin.

3. The cable securing device according to claim 2, characterized in that the tongue comprises at least one series of orifices, one series for each pin, the orifices belonging to one and the same series being positioned in use in a transverse plane perpendicular to the central axis of the cables.

4. The cable securing device according to claim 1, characterized in that one of the touch-and-close structures is loops and the other is hooks.

5. The cable securing device according to claim 4, characterized in that the tongue comprises the loops.

6. The cable securing device according to claim 4, characterized in that the first part comprises the hooks, wherein the hooks are integral with the first part.

7. The cable securing device according to claim 5, characterized in that the hooks are integral with the first part.

8. The cable securing device according to claim 4, characterized in that the tongue is connected, at its other end, permanently to the second peripheral edge of the second part.

9. The cable securing device according to claim 8, characterized in that the tongue is integral with the housing.

10. The cable securing device according to claim 1, characterized in that the housing is a split conduit.

11. A cable securing device, comprising:
    a base,
    a first part and a second part extending from the base and forming a housing having an interior surface, an exterior surface, and a diameter, wherein an elastomer coating is disposed on said interior surface of said housing, said first part having a first peripheral edge and said second part having a second peripheral edge bounding an opening therewithin for allowing a plurality of cables to be inserted into the said housing, wherein the distance between said first peripheral edge and said second peripheral edge is smaller than the diameter of said housing, said housing having a first thickness, and wherein said elastomer coating extends from said first peripheral edge to said second peripheral edge, a tongue integrally formed with said second part and extending from said second peripheral edge, said tongue having a second thickness, wherein said first thickness is greater than said second thickness, said tongue having a free end distal from the second part to connect with the first part so as to hold in use the cables in the housing, said tongue having an interior surface and being connected removably at said free end to the first peripheral edge, wherein the tongue comprises at least one orifice capable of engaging with a pin provided on an exterior surface of the first part, and wherein the interior surface of the tongue comprises a touch-and-close structure configured to engage with a touch-and-close structure provided on the exterior surface of the first part, the pin is by the touch-and-close structure on the exterior surface of the first part, and the at least one orifice is surrounded by the touch-and-close structure of the tongue.

* * * * *